United States Patent [19]
Chen et al.

[11] Patent Number: 5,902,919
[45] Date of Patent: May 11, 1999

[54] SUPPORTED LEWIS ACID CATALYST POLYMERIZATION PROCESS

[75] Inventors: Frank Joung-yei Chen; Christophe Le Deore, both of Edison, N.J.; Alain Guyot, Lyons; Alain Louis Pierre Lenack, Rouen, both of France; Jon Edmond Stanat, Westfield, N.J.

[73] Assignee: Exxon Chemical Patents Inc., Linden, N.J.

[21] Appl. No.: 09/089,459

[22] Filed: Jun. 2, 1998

Related U.S. Application Data

[63] Continuation of application No. 08/908,832, Aug. 8, 1997, Pat. No. 5,789,335, which is a continuation of application No. 08/220,766, Mar. 31, 1994, abandoned.

[51] Int. Cl.$^6$ ........................................................ C07C 2/02
[52] U.S. Cl. ............................ 585/520; 585/522; 585/523
[58] Field of Search ...................................... 585/520, 522, 585/523

[56] References Cited

U.S. PATENT DOCUMENTS 5,789,335   8/1998   Chen et al. .............................. 502/169

*Primary Examiner*—Hien Tran
*Assistant Examiner*—Thuan D. Dang
*Attorney, Agent, or Firm*—H. L. Cohen

[57] ABSTRACT

A supported Lewis acid catalyst, which comprises an inorganic oxide substrate having immobilized thereon at least one Lewis acid and a modifying agent containing at least one functional moiety capable of reacting with surface hydroxyl groups originally present on said substrate and which is effective as a catalyst for hydrocarbon conversion reactions including cationic polymerization, alkylation, isomerization and cracking reactions is disclosed.

2 Claims, No Drawings

SUPPORTED LEWIS ACID CATALYST POLYMERIZATION PROCESS

This is a continuation of application Ser. No. 08/908,832, filed Aug. 8, 1997, now U.S. Pat. No. 5,789,335 which is a continuation of application Ser. No. 08/220,766, filed Mar. 31, 1994, now abandoned.

TECHNICAL FIELD

This invention relates to supported Lewis acid catalyst systems of controlled activity, to processes for preparing the catalyst systems, and to various hydrocarbon conversion reactions which are performed in the presence of such catalyst systems. More particularly, the invention relates to catalyst systems for cationic polymerization, alkylation, isomerization and cracking reactions comprising at least one Lewis acid immobilized on an inorganic oxide support, wherein the support initially contains surface hydroxyl groups, wherein the support is selectively treated to reduce the number of hydroxyl groups contained on the surface thereof prior to immobilizing the Lewis acid thereon, and wherein the catalyst system is free from added titanium-, vanadium-, hafnium- or zirconium-containing components which catalyze Ziegler-type polymerization reactions.

BACKGROUND OF THE INVENTION

Lewis acids are among the most powerful initiators for hydrocarbon conversion reactions. Such catalysts have been used in liquid, gaseous and solid form, and have been supported or immobilized on various polymeric and inorganic substrates, including, for example, silica gel, alumina, graphite and various clays.

Both supported and unsupported Lewis acid catalysts have been used with varying degrees of success for initiating alkylation reactions, in the carbocationic polymerization of olefins, such as isobutene and in hydrocarbon isomerization and cracking reactions. Supported Lewis acid-type components, such as titanium trichloride, titanium tetrachloride, vanadium tetrachloride, and hafnium tetrachloride also have been used in Ziegler-type polymerization reactions where stereoregular or crystalline polymers are the desired polymeric product. In such Ziegler-type processes, the catalyst components are often supported on an inorganic oxide which has been pretreated, for example, with an alkyl halide silane, to reduce the number of free hydroxy groups on the surface of the support. Ziegler-type processes which are carried out in the presence of such pretreated supports are disclosed, for example, in U.S. Pat. Nos. 5,143,883; 4,374,753; and 4,565,795.

However, in spite of the general advances made in the fields of alkylation, polymerization, isomerization and cracking catalysis, there is a continuing need for highly efficient catalyst systems having a selectively controllable activity, as well an ability to be recycled or reused in such processes. The present invention was developed pursuant to this need.

SUMMARY OF THE INVENTION

In accordance with one aspect of the present invention, there is provided an immobilized Lewis acid catalyst system which is free from any added titanium-, vanadium-, hafnium- and zirconium-containing Ziegler-type components and which is active for various hydrocarbon conversion reactions, including, in particular, carbocationic olefin polymerization and alkylation reactions. According to this aspect, the immobilized catalyst system is in the form of a particulate inorganic oxide substrate which has been treated first to selectively reduce the number of hydroxyl groups on the surface of the substrate, and then to immobilize a Lewis acid thereon. The particulate inorganic oxide substrate which is to be used as the catalyst support may comprise any conventional inorganic substrate having surface hydroxyl groups, i.e., —OH groups. Such substrates include, for example, powders comprised of or including silica, alumina, magnesia, titania, zeolites, silica-alumina, silica-titania, silica-magnesia or the like.

In another aspect, an immobilized Lewis acid catalyst system may be prepared by reacting an inorganic, silicon-containing substrate having surface silanol groups, i.e., Si-OH groups, first with an agent, such as an organo silane compound, for selectively reacting with a portion of the silanol groups, and then with a Lewis acid catalyst component. In this aspect, it has been found that by reducing the number of silanol groups on the surface of the support before reacting the support with the Lewis acid catalyst component, the activity of the resulting catalyst system can be altered relative to a catalyst prepared without first reducing the number of silanol groups on the support.

Another aspect of the present invention provides a process for using the above immobilized Lewis acid catalyst system for cationically polymerizing a variety of monomers into substantially amorphous homopolymers and copolymers, e.g., polyalkenes, by contacting the monomers with the immobilized Lewis acid catalyst system of this invention under carbocationic polymerization conditions. The monomers which may be used according to this aspect of the invention include those having unsaturation which are conventionally polymerizable using carbocationic Lewis acid catalyst polymerization techniques, such as, for example, olefins characterized by the presence in their structure of the group $>C=CH_2$. As indicated previously, the catalyst system of this invention should be free from any added titanium-, vanadium-, hafnium- and zirconium-containing components which are known to catalyze Ziegler-type polymerization reactions and which produce primarily stereoregular polymers, as opposed to the generally amorphous polymers which are produced in accordance with the cationic polymerization process contemplated herein. To effect the present preferred continuous cationic polymerization process, at least one inlet stream comprising monomer feed to be polymerized is fed to a reactor having at least one discharge stream. The monomer stream is polymerized in the reactor in the presence of the above-described immobilized Lewis acid catalyst system. The resulting polymerized polymer is removed from the reactor along with the unreacted monomers in the discharge stream while the immobilized catalyst system is retained in the reactor.

In still other aspects, the catalyst systems of this invention may be used in hydrocarbon conversion processes such as isomerization, cracking and alkylation processes. As is known in the art, alkylation may be simply described as the addition or insertion of an alkyl group into a substrate molecule. Of particular interest is the alkylation of aromatic and hydroxy aromatic substrates, such as benzene, toluene, xylene and phenol. Suitable alkylating agents include, for example, olefins, alkanes, alkyl halides and mixtures. However, particularly preferred alkylating agents for use in the present invention include olefins, including olefin oligomers, such as propylene oligomers, having from about 6 to about 50 carbon atoms and having one double bond per molecule.

A significant advantage of the present invention is that it enables the preparation of supported hydrocarbon conversion catalysts having a preselected activity by controlling the number of hydroxyl or silanol groups which are available on the support for reaction with the Lewis acid catalyst components. Another advantage of the present catalysts is that they are substantially stable and do not leach or otherwise deposit free Lewis acid into the reaction medium or, more importantly, into the reaction products; i.e., substantially all of the Lewis acid catalyst is immobilized or fixed to the support. Another advantage is that the present catalyst systems are usable for multiple reaction cycles (in the context of a batch process) without regeneration, resulting in substantial cost savings, as well as the elimination of significant amounts of hazardous waste typically generated in conventional Lewis acid processes. Not only can the Lewis acid catalyst systems of the present invention be employed for multiple cycles, but also on a continuous basis for extended times of reaction (e.g., polymerization, alkylation, isomerization and cracking), and they can also be recovered readily by simple filtration techniques.

DETAILED DESCRIPTION OF THE PREFERRED EMBODIMENTS

The novel immobilized Lewis acid catalyst systems of the present invention may be prepared by first pretreating an inorganic oxide support material having surface hydroxyl groups with a relatively non-catalytic agent to reduce the number of surface hydroxy groups on the support, followed by fixing or immobilizing at least one Lewis acid on the support surface.

For the purposes of this invention the terms fixed or immobilized are used interchangeably and are defined as wherein substantially all of the active Lewis acid is chemically bound to the substrate, e.g., by forming —O-metal bonds with the metals of the Lewis acids. In other words, the Lewis acids are not readily extracted by a solvent or diluent under conditions of polymerization, alkylation, isomerization or cracking. The substrates which may be used to prepare the supported Lewis acid catalyst systems of this invention include any of the conventional inorganic oxide substrates which contain free hydroxyl groups which can react with the selected pretreating agent and the Lewis acid catalyst components. Generally speaking any metal oxide which has surface hydroxyl groups can be utilized as the substrate. The terms "metal oxide" and "inorganic oxide", although typically used herein in the singular, are meant to include single oxides, such as silica or alumina, as well plural and complex oxides, such as silica-alumina, silica-alumina-thoria, zeolites and clays.

Non-limiting examples of such inorganic oxides include silica, alumina, titania, magnesia, silica-alumina, silica-titania, silica-magnesia, silica-alumina-thoria, silica-alumina-zirconia, crystalline aluminosilicates, including synthetic zeolites such as, for example, A, X, and ZSM-5 zeolites, and naturally occurring zeolites such as, for example, faujasite and mordenite, and open lattice clays, such as bentonite and montmorillonite. The preferred inorganic oxide substrates typically are in the form of powders or particles, and include a major component of silica or alumina or a mixture of both.

Particularly suitable as substrates are those solid inorganic oxide compositions known as metal oxide gels or gel oxides. Preferred oxide gel materials include those gel materials selected from the group consistng of silica, alumina, alumina-silica, zeolites and open lattice clays. Silica gel and silica-alumina gel substrates, which contain surface silanol groups, i.e., Si-OH groups, are particularly preferred.

The particular substrate materials are not critical, provided that they do not interfere with the conversion processes for which the resulting immobilized Lewis acid catalyst systems are intended to be used, and provided that they contain the hydroxyl groups which are necessary to react with, and thereby fix or immobilize, the Lewis acid catalyst components.

The substrate material of reduced hydroxyl content is prepared by pretreating the substrate with a substantially non-catalytic organosilicon modifying agent that will react with a portion of the hydroxy groups on the substrate. The organosilicon modifying agent must have at least one functional group which can react with the surface hydroxyl groups of the support amterial, and by means of this reaction the organic silicon residue must be bonded to the surface of the support. Prior to the reaction between the organosilicon compound and the support, the support may be dried at a temperature below about 800° C. to remove the free water and control the amount of —OH groups on the support. Generally, it is preferred to remove completely the surface free water from the inorganic oxide support.

The organosilicon compounds that are contemplated for use in the present invention may have one of the following formulas:

(a) $(R_3Si)_2NH$ or (b) $R_nSiX_m$, where m is 1, 2, 3 or 4 and n is 3, 2, 1 or 0, respectively, and the total of m+n is 4; X is a moiety chemically reactive with the hydroxyl groups of the inorganic oxide support, such as, for example, halogen (typically chlorine or bromine), amide, alkoxide, phenoxide, hydroxide and the like; and R is hydrogen or a hydrocarbon group containing only carbon and hydrogen, such as, for example, $C_1$–$C_{24}$ alkyl, typically $C_1$–$C_4$ alkyl, $C_6$–$C_{18}$ aryl, typically $C_6$–$C_{12}$ aryl, such as phenyl, or $C_2$–$C_{24}$ alkenyl, typically $C_2$–$C_6$ alkenyl,such as vinyl.

The invention requires at least one such reactive moiety. If more than one are used, they may be the same or different. Examples of reactive moieties are —Cl, —Br, —OCH$_3$, —OCH$_2$CH$_3$, —NH$_2$, —N(CH$_3$)$_2$, —N(H)Si(CH$_3$)$_3$, —CH$_2$CH$_2$CH$_2$Cl, —O$_2$CCH$_3$, and —CH$_2$SH.

Non-limiting examples of suitable organosilicon modifying compounds which may be used to react with a portion of the hydroxyl groups on the inorganic oxide substrate include trimethylchlorosilane, triethylchlorosilane, tributylfluorosliane, trihexylbromosilane, trivinylchlorosilane, hexamethyl disilazane, trimethylsilyl ethoxide, triphenylsilanol and the like.

In preferred embodiments of this invention, the organosilicon modifying compounds are reacted with a portion of the silanol groups on the surface of a silica-containing support, prior to immobilizing the Lewis acid catalyst components thereon, by dispersing the support in a suitable medium, such as heptane, and then contacting the dispersed support with one or more of the modifying compounds at a temperature in the range of from about 0° C. to about 100° C., typically from about about 15° C. to about 80° C., over a period of from about 30 minutes to about 2 days, typically from about 4 hours to about 1 day.

Typically, greater than about 5% of the silanol groups are modified by treatment with the organosilicon compound; preferably greater than about 15%; more preferably greater than about 20%. Generally, about 5% to about 99% of the silanol groups are modified; preferably about 10 to about 95%; more preferably about 15 to about 90% most preferably about 20 to about 85%.

The support, whose surface has been modified as described above, comprises a surface subpopulation of unreacted free hydroxyl groups, and preferably silanol groups, which are capable of reacting with and thereby immobilizing the Lewis acid catalyst components to form supported Lewis acid catalyst systems which differ structurally from those which are prepared by reacting Lewis acid catalyst components with unmodified oxide supports.

The structural differences between the modified catalysts of the present invention and those prepared without first modifying the oxide support material can be appreciated more fully by reference to the following schematic equations, wherein silica is the support material, $AlCl_3$ is the Lewis acid that is to be supported, Equation (1) represents catalyst immobilization without prior surface modification of the support, and Equarion (2) represents initial surface modification followed by catalyst immobilization:

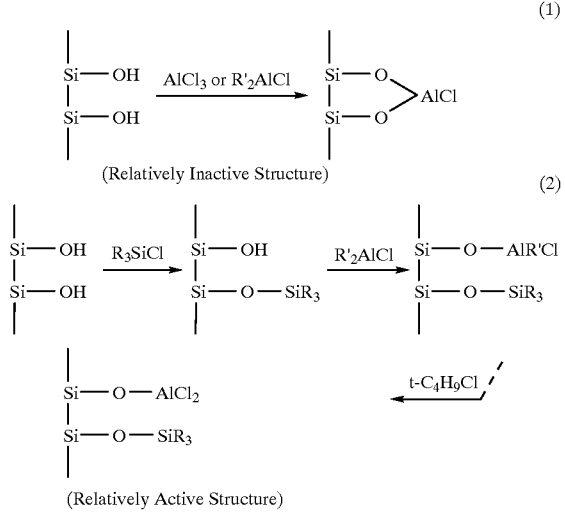

Among the Lewis acids which are contemplated for use in this invention, there may be included all those known Lewis acids which effectively catalyze hydrocarbon conversion processes including cationic olefin polymerization, alkylation, isomerization and cracking reactions. Those Lewis acids which are to be excluded from the catalyst systems of the invention are those which are known to function as Ziegler-type catalysts, such as the titanium-, vanadium-, hafnium-, and zirconium-containing compounds which tend to catalyze the formation of stereospecific, crystalline polymers, as opposed to random, amorphous olefin polymers.

Typically, the Lewis acid catalyst components which are contemplated for use herein comprise the halides, alkyl halides and alkyl compounds of aluminum, magnesium, tin and zinc, the halides of boron, and equivalents thereof. For the purposes of this invention, magnesium Lewis acids should be used in combination with a stronger Lewis acid, e.g., aluminum Lewis acids. Preferred Lewis acids include, for example, aluminum compounds having the formula $R_nAlX_{3-n}$, where R is a monovalent hydrocarbon radical, preferably $C_1$–$C_{12}$ alkyl or $C_6$ to $C_{18}$ aryl, n is a number from 0 to 3, and X is a halogen independently selected from the group consisting of fluorine, chlorine, bromine and iodine; and magnesium compounds having the formula $R^1_mMgX^1_{2-m}$, where $R^1$ is a monovalent hydrocarbon radical, preferably $C_1$–$C_{12}$ alkyl or $C_6$–$C_{18}$ aryl, m is 1 or 2, and $X^1$ is a halogen independently selected from the group consisting of fluorine, chlorine, bromine and iodine. Non-limiting examples of such preferred Lewis acids include triethyl aluminum $((C_2H_5)_3Al)$, diethyl aluminum chloride $((C_2H_5)_2AlCl)$, ethyl aluminum dichloride $(C_2H_5AlCl_2)$, ethyl aluminum sesquichloride $((C_2H_5)_{1.5}AlCl_{1.5})$, aluminum chloride $(AlCl_3)$, $SnCl_4$, $ZnCl_2$ and mixtures thereof.

As indicated above, titanium-, vanadium-, hafnium-, and zirconium-containing Lewis acids, such as $TiCl_3$, $VCl_4$, $HfCl_4$ and $ZrCl_4$ should be avoided inasmuch as they promote Ziegler-type catalysis.

After modifying the inorganic oxide support as described above, the selected Lewis acid catalyst components may be reacted with the remaining subpopulation of unreacted free hydroxyl groups on the support by contacting the support with the selected Lewis acids at a temperature ranging from about room temperature up to about 200° C. or higher, and preferably, from about room temperature to about 110° C. Also, depending upon the acidity of the after having been contacted with the surface modifying agent and the Lewis acids, it may be desirable to further contact the substrate with a halogenating agent, such as t-butyl chloride (as was illustrated in schematic Equation 2 above) to convert residual hydrocarbyl radicals to more acidic halogen moieties. In this latter instance, the halogenating agents which may be employed include, for example, alkyl halides, halogens, hydrogen halides. Non-limiting examples of suitable halogenating agents include HCl, $Cl_2$ and compounds having the formula $R^2Cl$, where $R^2$ is a hydrocarbon radical, typically a $C_2$–$C_{10}$, preferably a $C_2$–$C_5$, secondary or tertiary alkyl radical, e.g., t-butyl chloride.

The novel immobilized catalysts of the present invention may be used to polymerize a variety of monomers into homopolymers and copolymers, e.g., polyalkenes. The monomers include those having unsaturation which are conventionally polymerizable using carbocationic Lewis acid catalyst polymerization techniques, and monomers which are the equivalents thereof. The terms cationic and carbocationic are used interchangeably herein. Olefin monomers useful in the practice of the present invention are polymerizable olefin monomers characterized by the presence of one or more ethylenically unsaturated groups. The monomers can be straight or branched monoolefinic monomers, such as vinyl ethers, propylene, 1-butene, isobutylene, and 1-octene, or cyclic or acyclic conjugated or non-conjugated dienes.

Suitable olefin monomers are preferably polymerizable terminal olefins; that is, olefins characterized by the presence in their structure of the group $>C=CH_2$. However, polymerizable internal olefin monomers (sometimes referred to in the patent literature as medial olefins) characterized by the presence within their structure of the group:

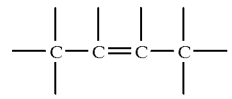

can also be used to form polymer products. When internal olefin monomers are employed, they normally will be employed with terminal olefins to produce polyalkenes which are interpolymers. For purposes of the invention, when a particular polymerized olefin monomer can be classified as both a terminal olefin and an internal olefin, it will be deemed to be a terminal olefin. Thus, 1,3-pentadiene (i.e., piperylene) is deemed to be a terminal olefin for purposes of this invention.

Preferred monomers used in the method for forming a polymer in accordance with the present invention are preferably selected from the group consisting of alpha-olefins and typically $C_3$–$C_{25}$ alpha olefins. Suitable alpha-olefins may be branched or straight chain, cyclic, and aromatic substituted or unsubstituted, and are preferably $C_3$–$C_{16}$ alpha-olefins. Mixed olefins can be used (e.g., mixed butenes).

The alpha-olefins, when substituted, may be directly aromatic substituted on the 2-carbon position (e.g., monomers such as $CH_2=CH–C_6H_5$ may be employed). Representative of such monomers include styrene, and derivatives such as alpha-methyl styrene, para-methyl styrene, vinyl toluene and its isomers.

In addition, substituted alpha-olefins include compounds of the formula $H_2C=CH–R^3–X^2$ wherein $R^3$ represents $C_1$ to $C_{22}$ alkyl, preferably $C_1$ to $C_{10}$ alkyl, and $X^2$ represents a substituent on $R^3$ and can be aryl, alkaryl, or cycloalkyl. Exemplary of such $X^2$ substituents are aryl of 6 to 10 carbon atoms (e.g., phenyl, naphthyl and the like), cycloalkyl of 3 to 12 carbon atoms (e.g., cyclopropyl, cyclobutyl, cyclohexyl, cyclooctyl, cyclodecyl, cyclododecyl, and the like) and alkaryl of 7 to 15 carbon atoms (e.g., tolyl, xylyl, ethylphenyl, diethylphenyl, ethylnaphthyl, and the like). Also useful are bicyclic, substituted or unsubstituted olefins, such as indene and derivatives, and bridged alpha-olefins of which $C_1$–$C_9$ alkyl substituted norbornenes are preferred (e.g., 5-methyl-2-norbornene, 5-ethyl-2-norbornene, 5-(2'-ethylhexyl)-2-norbornene, and the like).

Illustrative non-limiting examples of preferred alpha-olefins are propylene, 1-butene, isobutene, 1-pentene, 1-hexene, 1-octene, and 1-dodecene.

Dienes suitable for purposes of this invention include straight chain, hydrocarbon diolefins or cycloalkenyl-substituted alkenes having about 6 to about 15 carbon atoms, including, for example, 1,4-hexadiene, 5-methyl-1,4-hexadiene, 1,3-cyclopentadiene, tetrahydroindene, dicyclopentadiene, 5-methylene-2-norbornene, 5-cyclohexylidene-2-norbornene, 5-vinyl-2-norbornene, allyl cyclohexene and vinyl cyclododecene.

Of the non-conjugated dienes typically used, the preferred dienes are dicylcopentadiene, methyl cyclopentadiene dimer, 1,4-hexadiene, 5-methylene-2-norbornene, and 5-ethylidene-2-norbornene. Particularly preferred diolefins are 5-ethylidene-2-norbornene and 1,4-hexadiene.

The polymers and copolymers which can be manufactured by the process of the present invention are those which can be manufactured by a carbocationic polymerization process and include but are not limited to polyalkenes, such as polyisobutene, poly(1-butene), polystyrene, isobutene styrene copolymers, and the like. The term copolymer as used herein is defined to mean a polymer comprising at least two different monomer units.

In particular, the immobilized catalysts of the present invention are especially useful for manufacturing polyisobutene and poly(1-butene) from feedstreams containing butene monomers. It is especially preferred to use refinery feed streams containing $C_4$ monomers, commonly referred to as Raffinate I and Raffinate II.

The polymers and copolymers which are manufactured using the immobilized Lewis acid catalyst system of the present invention may be referred to as reactive polymers in the sense that they are characterized by having terminal or non-terminal vinylidene unsaturation in at least 40% of their polymer chains. Substantial non-terminal vinylidene unsaturation in conventional Lewis acid catalyzed polymers has not been observed. This differs from polymer products which have been prepared using conventional non-supported Lewis acid catalysts wherein a single Lewis acid, such as ethyl aluminum dichloride, is employed (typically less than 20% of the chains of polymers of this type contain vinylidene unsaturation), as well as from polymer products prepared using conventional $BF_3$ catalysis (typically 40% or more of the polymer chains contain terminal vinylidene).

For purposes of this comparison, polyisobutylene polymer chains having terminal vinylidene unsaturation may be illustrated as follows:

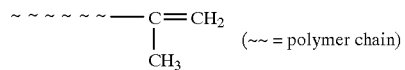

(~~ = polymer chain)

Polyisobutylene polymer chains having non-terminal (internal) vinylidene unsaturation may be illustrated as follows:

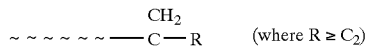

(where R ≥ $C_2$)

The carbocationic polymerization process of the present invention may be carried out in a polar or, preferably, non-polar reaction medium as a continuous, semi-continuous or batch process. Suitable polar solvents which may be used as the polymerization reaction medium include, for example, methyl chloride, dichloromethane, ethyl chloride or nitromethane or the like, whereas suitable non-polar solvents include, for example, carbon tetrachloride, hexane, heptane, cyclohexane, and more generally the linear or branched, saturated or unsaturated hydrocarbon solvents which can be found in the stream of monomers obtained from various cracking processes.

The reactors which may be utilized in the practice of the present invention include conventional reactors and equivalents thereof such as batch reactors, stirred tank reactors, fluidized bed reactors, and continuous tank or tubular reactors and the like.

The reactor will contain sufficient amounts of the immobilized catalyst system of the present invention effective to catalyze the polymerization of the monomer containing feedstream such that a sufficient amount of polymer having desired characteristics is produced. The reaction conditions will be such that sufficient temperature, pressure and residence time are maintained effective to maintain the reaction medium in the liquid state and to produce the desired polymers having the desired characteristics.

Typically, the catalyst to monomer ratio utilized will be those conventional in this art for carbocationic polymerization processes. For example, catalyst to monomer mole ratios will typically be about 1/60000 to about 1/50, more typically about 1/10000 to about 1/100, and preferably about 1/1000 to about 1/200. This mole ratio will be calculated by determining the number of Lewis acid catalyst sites in the immobilized Lewis acid catalyst. This can be done by using conventional analytic testing techniques such as elemental analysis, NMR (e.g., aluminum NMR) and absorption spectroscopy. Once the number of Lewis acid sites per unit of immobilized catalyst is known, the mole ratio is calculated in a conventional manner.

The polymerization reaction temperature is conveniently selected based on the target polymer molecular weight and the monomer to be polymerized as well as standard process variable and economic considerations, e.g., rate, temperature control, etc. Typically temperatures from about –100° C. to about +75° C. are useful in the process; more typically about –50° C. to about +50° C., depending, as noted above, on polymer molecular weight. Reaction pressure will typically be about 200 kPA to about 1600 kPA, more typically about 300 to about 1200 kPA, and preferably about 400 to about 1000.

The monomer feedstream to this process may be at least one pure or mixed monomer feedstream or combinations thereof. Preferably, the monomer feedstream may be mixed with solvents such as hexane or heptane, and the like. A preferred feedstream to this process may be a pure or mixed refinery butene stream containing one or more of 1-butene, 2-butene, (cis and trans), and isobutene. The preferred feedstreams (preferred on an availability and economic basis) are available from refinery catalytic crackers and steam crackers. These processes are known in the art. The butene streams typically contain between about 6 wt. % to about 50 wt. % 30 isobutylene together with 1-butene, cis- and trans-2-butene, isobutane and less than about 1 wt. % butadiene. One particularly preferred $C_4$ feedstream is derived from refinery catalytic or steam cracking processes and contains about 6–45 wt. % isobutylene, about 25–35 wt. % saturated butanes and about 15–50 wt. % 1- and 2-butenes. Another preferred $C_4$ feedstream is referred to as Raffinate II characterized by less than about 6 wt. % isobutylene.

The monomer feedstream is preferably substantially anhydrous, that is, it contains less than 50 ppm, and more preferably less than about 30 ppm, and most preferably less than about 10 ppm, by weight of water. Such low levels of water can be obtained by contacting the feedstream, prior to the reactor, with a water absorbent (such as NaH, $CaCl_2$, $CaSO_4$, molecular sieves and the like) or by the use of distillation drying.

The monomer feedstream is typically substantially free of any impurity which is adversely reactive with the catalyst under the polymerization conditions. For example, the monomer feed preferably should be substantially free of bases (such as caustic), sulfur-containing compounds (such as $H_2S$, COS, and organo-mercaptans, e.g., methyl mercaptan, ethyl mercaptan), N-containing compounds, and the like.

The monomer feedstream is typically substantially free of aromatic compounds to avoid alkylation reactions. Therefore, use of an aromatic solvent generally is not envisioned in this polymerization process.

A material acting as a cocatalyst (or promoter) may optionally be added to a monomer feedstream before that feed is introduced to a reactor or it may be added separately to the reactor, e.g., to the catalyst bed. A variety of conventional cocatalysts or equivalents can be used including inorganic acids such as hydrogen halides, lower alcohols, $C_2$–$C_{24}$ secondary or tertiary alkyl halides, organic acids such as carboxylic acids and sulfonic acids, and the like. For example, gaseous, anhydrous HCl, may be employed as a cocatalyst. The HCl will be employed in a catalytically effective amount, which amount will generally range from about 50 to 5,000 ppm by weight of the monomer feed, preferably 50 to 500 ppm (e.g., 70 to 200 ppm) by weight of the monomer feed when the monomer feed comprises >5 wt. % isobutylene, and preferably from about 100–5,000 ppm (e.g., 400–3,000 ppm) by weight when the feed comprises n-butenes and <5 wt. % isobutylene. If anhydrous HCl is added to the feedstream containing isobutene, t-butyl chloride is formed before contact with the solid catalyst.

The order of contacting the monomer feedstream, catalyst, cocatalyst (if any), and solvent is not critical to this invention. Accordingly, the catalyst and cocatalyst can be added to the reactor before or after adding the monomer feedstream and solvent. Alternatively, the catalyst and monomer feedstream can be added before or after adding the cocatalyst and solvent.

The degree of polymerization of polymers (and oligomers) produced with the catalyst of this invention will be determined by the desired end use. Typically the degree of polymerization is from about 5 to 5,000; more typically from about 10 to about 1,000; for lower molecular weight polymers and oligomers the degree of polymerization will typically be about 5 to about 100. Correspondingly, the number average molecular weight, $M_n$, of a polymeric product will be determined by the monomer and degree of polymerization; for a $C_4$-based polymer typical values are from about 300 to about 300,000 gm/mole, depending on the intended end use of the product. Number average molecular weight is conveniently measured by a suitably calibrated gel permeation chromatography (GPC) instrument. The polydispersity index (PDI) of the polymer, also known as the molecular weight distribution ($M_w/M_n$), will typically range from about 4 to about 25, more typically about 5 to about 22, and preferably about 6 to about 20.

Lewis acid catalysts of the present invention also find use in other hydrocarbon conversion processes including alkylation, isomerization and cracking. For example, the catalysts may be employed in the cracking of long chain hydrocarbons, e.g., heptane, butane, etc., to produce shorter chain products such as ethane, propane, butanes, etc. Additionally, the catalysts may be used to catalyze the isomerization of normal alkanes to their branched chain isomers.

The alkylation process of the present invention will be conducted by contacting the aromatic or hydroxy aromatic substrate and alkylating agent under reaction conditions, including mole ratio, temperature, time and catalyst ratio sufficient to alkylate the substrate.

The hydroxy aromatic substrate compounds useful in the preparation of the alkylated materials of this invention include those compounds having the formula:

wherein Ar represents

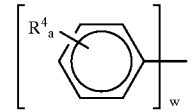

and z is an integer from 1 to 2, w is an integer from 1–3, a is 1 or 2 and $R^4$ is a $C_1$–$C_{24}$ alkyl radical.

Illustrative of such Ar groups are phenylene, biphenylene, naphthalene and the like.

The aromatic substrate compounds useful in the preparation of the alkylated materials of this invention include those compounds having the formulas:

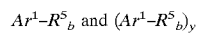

wherein $Ar^1$ represents:

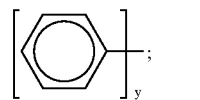

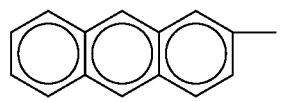

or

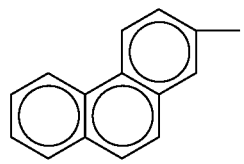

wherein b is one or two; $R^5$ is $C_1$–$C_{24}$ alkyl, $C_3$–$C_{24}$ cycloalkyl, $C_6$–$C_{18}$ aryl, $C_7$–$C_{30}$ alkylaryl, OH, or H; and y is 1–3.

Illustrative of such $Ar^1$ groups are benzene, phenylene, biphenylene, naphthalene, and anthracene.

The substrate to be alkylated generally will be contacted in a molar ratio of from about 0.1 to 10 preferably from about 1 to 7, more preferably from about 2 to 5, moles of the substrate per mole of the alkylating agent. Conventional ratios of alkylating agent typically will be used. The ratio typically will be about 0.5 to 2:1, more typically about 0.8 to about 1.5:1, and preferably about 0.9 to about 1.2:1. The selected catalyst can be employed in widely varying concentrations. Generally, the catalyst will be charged to provide at least about 0.001, preferably from about 0.01 to 0.5, more preferably from about 0.1 to 0.3, moles of Lewis acid catalyst per mole of substrate charged to the alkylation reaction zone. Use of greater than 1 mole of the Lewis acid catalyst per mole of substrate is not generally required. The reactants can be contacted with the present immobilized Lewis acid catalyst system employing any conventional solid-liquid contacting techniques, such as by passing the reactants through a fixed bed of catalyst particles. The upper limit on the moles of catalyst employed per mole of substrate compound is not critical.

The temperature for alkylation can also vary widely, and will typically range from about 10° to 250° C., preferably from about 20° to 150° C., more preferably from about 25° to 80° C.

The alkylation reaction time can vary and will generally be from about 1 to 5 hours, although longer or shorter times can also be employed. The alkylation process can be practiced in a batchwise, continuous or semicontinuous manner.

Alkylation processes of the above types are known and are described, for example, in U.S. Pat. Nos. 3,539,633 and 3,649,229, the disclosures of which are hereby incorporated by reference.

The invention will be understood more fully in conjunction with the following examples which are merely illustrative of the principles and practice thereof. The invention is not intended to be limited by these illustrative examples. Parts and percentages where used are parts and percentages by weight, unless specifically noted otherwise.

Example 1: Catalyst Synthesis ($SiO_2$/($CH_3$)$_3$SiCl/ DEAC/t-BuCl)

Silica (W. R. Grace 1952) having a specific area of 300 $m^2$/g was dehydrated by heating under vacuum at 450° C. for one hour. To 2.2 g of the dehydrated silica (2.2 mmol OH) in heptane, there was added 1.76 mmol of purified trimethylchlorosilane (equivalent to about 80% of the silanol groups in the silica). This mixture was stirred for 10 hours at room temperature and for an additional 7 hours at boiling heptane temperature (100° C.) After washing and drying under vacuum, 0.77 mmol of diethyl aluminum chloride (DEAC) in 50 ml of heptane were added. After 3 hours at room temperature, the silica was washed three times with heptane. One mmol of t-butyl chloride (t-BuCl) in heptane was then added and after one hour at room temperature, the supported catalyst product was washed with heptane and dried under vacuum at 100° C. for 1.5 hours.

Example 2: Isobutene Polymerization (Runs 1–5)

In a glass flask equipped with a dropping funnel, a thermometer and a pressure transducer, there were placed 100 ml of heptane and the amount of isobutene monomer indicated in Table 1. To this mixture, maintained at −20° C., there was added an amount of the catalyst system prepared in Example 1. For Runs 2 and 5, the contents of the flask were maintained at the indicated temperature for the indicated period, and for Runs 1, 3 and 4, the temperature of the reactor rose during the polymerization reaction; after which the polymerization reaction was discontinued and the reaction products were analyzed by gel permeation chromatography (GPC) in tetrahydrofuran (THF) using polystyrene as the standard. The results are set forth in Table 1 hereinbelow. The above procedure was repeated (Runs 2–5), except that the polymerization medium was first dried using NaH as a dessicant (Runs 3–5). In the runs wherein NaH was used as a dessicant, about 0.1 to 0.5 g of NaH were introduced under an argon atmosphere from a Schlenck tube into the polymerization flask containing about 70 g of the heptane solvent medium. The monomer was then added to the flask and the mixture was allowed to stand for about 15 minutes before starting the polymerization. The results of the runs in which NaH was used as a dessicant are also set forth in Table 1.

TABLE 1

| Run No. | Monomer moles/l | catalyst, g/l | T, °C. | ΔT, °C. | Conv., % | Time, min. | $M_n$ | $M_w$ |
|---|---|---|---|---|---|---|---|---|
| 1* | 2.7 | 0.93 | −20 | 27 | — | 17 | 2400 | 16780 |
| 2* | 2.45 | 0.35 | −20 | 0 | 18.1 | 30 | 2930 | 33780 |
| 3 | 3 | 0.2 | −20 | 28 | 73 | 10 | 1590 | 16550 |
| 4 | 2.9 | 0.15 | −20 | 8 | 55 | 10 | 2090 | 24380 |
| 5 | 2.5 | 0.12 | −20 | 0 | 38.1 | 30 | 2580 | 32100 |

*without NaH desiccant

It will be seen from the data in Table 1, that the conversion rates are relatively high even though the polymerization reactions were performed in the absence of any added cocatalyst. This is due to the fact that the supported catalyst contains primarily active —Si—O—$AlCl_2$ moieties and little, if any, inactive moities of the following type:

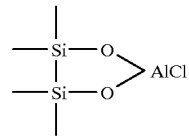

Example 3: Toluene Alkylation

In a glass flask are placed 200 mg of catalyst (Example 1), 50 ml of toluene and 10 ml of 1-hexene. After stirring for 5 hours at room temperature the reaction mixture is filtered and analyzed by gas chromatography. The reaction mixture is constituted of unreacted hexene, toluene, hexyltoluene, dihexyltoluene and trihexyltoluene.

What is claimed is:

1. A process for cationic polymerization, which comprises: contacting olefin monomer under cationic polymerization reaction conditions with a catalytically effective amount of supported Lewis acid catalyst that is free from added titanium-, vanadium-, hafnium- and zirconium-containing Ziegler polymerization components, said catalyst comprising an inorganic oxide substrate having immobilized thereon a catalytically effective amount of at least one Lewis acid catalyst component and a substantially non-catalytic organosilicon modifying agent containing at least one functional moiety capable of reacting with surface hydroxyl groups originally present on said substrate wherein about 5% to about 99% of said surface hydroxyl groups have been modified with said non-catalytic organosilicon agent to be non-reactive with said Lewis acid catalyst component; wherein said Lewis acid catalyst component is at least one component selected from the group consisting of halides, alkyl halides and alkyl compounds of aluminum, magnesium, tin and zinc, halides of boron and mixtures thereof; with the proviso that when said Lewis acid catalyst component is a magnesium compound it is used in combination with a stronger Lewis acid from said group.

2. The process according to claim 1, wherein said inorganic oxide substrate comprises at least one silicon-containing oxide initially comprising surface Si-OH groups, and wherein said modifying agent comprises at least one organosilicon compound having a formula selected from the following formulas (a) and ((b):

(a) $(R_3Si)_2NH$ and (b) $R_nSiX_m$, where m is 1, 2, 3 or 4 and n is 3, 2, 1 or 0, respectively, and the total of m+n is 4; X is a moiety chemically reactive with said Si-OH groups of said silicon-containing oxide substrate; and R is hydrogen or a hydrocarbon groups.

* * * * *